US008745731B2

(12) United States Patent
Achan et al.

(10) Patent No.: US 8,745,731 B2
(45) Date of Patent: Jun. 3, 2014

(54) CLUSTERING BOTNET BEHAVIOR USING PARAMETERIZED MODELS

(75) Inventors: Kannan Achan, Mountain View, CA (US); Yinglian Xie, Cupertino, CA (US); Fang Yu, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 1327 days.

(21) Appl. No.: 12/061,664

(22) Filed: Apr. 3, 2008

(65) Prior Publication Data

US 2009/0254989 A1    Oct. 8, 2009

(51) Int. Cl.
*G06F 11/00* (2006.01)
*G06F 12/14* (2006.01)
*G06F 12/16* (2006.01)
*G06F 7/04* (2006.01)

(52) U.S. Cl.
USPC ............. 726/22; 726/23; 726/24; 726/25; 726/26; 709/206; 709/223

(58) Field of Classification Search
None
See application file for complete search history.

(56) References Cited

U.S. PATENT DOCUMENTS

| 6,615,242 | B1 | 9/2003 | Riemers |
| 7,209,954 | B1 * | 4/2007 | Rothwell et al. ............... 709/206 |
| 7,260,846 | B2 * | 8/2007 | Day ................................ 726/23 |
| 7,263,607 | B2 | 8/2007 | Ingerman et al. |
| 7,269,851 | B2 | 9/2007 | Ackroyd |
| 7,272,853 | B2 | 9/2007 | Goodman et al. |
| 7,307,997 | B2 | 12/2007 | Vinokurov et al. |
| 7,496,549 | B2 * | 2/2009 | Selvaraj ........................... 706/25 |
| 7,690,037 | B1 * | 3/2010 | Hartmann ........................ 726/23 |
| 8,291,024 | B1 * | 10/2012 | Cheng et al. .................... 709/206 |
| 2005/0262209 | A1 * | 11/2005 | Yu ..................................... 709/206 |
| 2006/0095521 | A1 * | 5/2006 | Patinkin .......................... 709/206 |
| 2006/0123083 | A1 * | 6/2006 | Goutte et al. ................... 709/206 |
| 2006/0190481 | A1 * | 8/2006 | Alspector et al. ......... 707/103 R |
| 2007/0185960 | A1 * | 8/2007 | Leiba et al. .................... 709/206 |
| 2007/0239639 | A1 * | 10/2007 | Loughmiller et al. .......... 706/20 |
| 2008/0080518 | A1 * | 4/2008 | Hoeflin et al. ............ 370/395.42 |
| 2008/0126951 | A1 * | 5/2008 | Sood et al. ...................... 715/752 |
| 2009/0070872 | A1 * | 3/2009 | Cowings et al. ................ 726/23 |
| 2010/0154058 | A1 * | 6/2010 | Kay ................................. 726/23 |

OTHER PUBLICATIONS

Wei et al, "Profiling and Clustering Internet Hosts", Proceedings of the 2006 International Conference on Data Mining, Jun. 2006, pp. 269-275.

(Continued)

*Primary Examiner* — Cordelia Zecher
*Assistant Examiner* — Trang Doan
(74) *Attorney, Agent, or Firm* — Micah Goldsmith; Glen Johnson; Micky Minhas (57) ABSTRACT

Identification and prevention of email spam that originates from botnets may be performed by finding similarity in their host property and behavior patterns using a set of labeled data. Clustering models of host properties pertaining to previously identified and appropriately tagged botnet hosts may be learned. Given labeled data, each botnet may be examined individually and a clustering model learned to reflect upon a set of selected host properties. Once a model has been learned for every botnet, clustering behavior may be used to look for host properties that fit into a profile. Such traffic can be either discarded or tagged for subsequent analysis and can also be used to profile botnets preventing them from launching other attacks. In addition, models of individual botnets can be further clustered to form superclusters, which can help understand botnet behavior and detect future attacks.

17 Claims, 5 Drawing Sheets

(56) References Cited

OTHER PUBLICATIONS

Strayer et al, "Detecting Botnets with Tight Command and Control", Proceedings 2006 31st IEEE Conference on Local Computer Networks, Nov. 2006, pp. 195-202.

Ramachandran et al, "Filtering Spam with Behavioral Blacklisting", Proceedings of the 14th ACM conference on Computer and communications security, Alexandria, Virginia, USA, 2007, pp. 342-351.

Cooke et al, "The Zombie Roundup: Understanding, Detecting, and Disrupting Botnets", Proceedings of the Steps to Reducing Unwanted Traffic on the Internet Workshop, Cambridge, MA, 2005 pp. 1-6.

Collins et al, "Predicting Future Botnet Addresses with Uncleanliness", May 9, 2007, in Proceedings of the 2007 Internet Measurement Conference (IMC'07), 2007, pp. 1-14.

* cited by examiner

CLUSTERING BOTNET BEHAVIOR USING PARAMETERIZED MODELS

BACKGROUND

The term botnet refers to a group of compromised host computers (bots) that are controlled by a small number of commander hosts generally referred to as Command and Control (C&C) servers. Botnets have been widely used for sending large quantities of spam emails. By programming a large number of distributed bots, where each bot sends only a few emails, spammers can effectively transmit thousands of spam emails in a short duration. To date, detecting and blacklisting individual bots is difficult due to the transient nature of the attack and because each bot may send only a few spam emails. Furthermore, despite the increasing awareness of botnet infections and associated control processes, there is little understanding of the aggregated behavior of botnets from the perspective of email servers that have been targets of large scale botnet spamming attacks.

SUMMARY

Identification and prevention of email spam that originates from botnets may be performed by finding similarity in their host property and behavior patterns using a set of labeled data. Clustering models of host properties pertaining to previously identified and appropriately tagged botnet hosts may be learned. Given labeled data, each botnet may be examined individually and a clustering model learned to reflect upon a set of selected host properties. Once a model has been learned for every botnet, clustering behavior may be used to look for host properties that fit into a profile. Traffic that fits the learned models can be either discarded or tagged for subsequent analysis and can also be used to further profile botnets preventing them from launching other attacks.

In some implementations, spammer detection may include collecting data related to hosts at a vantage point, analyzing selected features within the data, determining clusters of hosts based on the features, and computing distance between the vectors in clusters. The features may include email contents, sending time of the emails, or other sending behavior.

In some implementations, determining botnets may include acquiring data at a single vantage point, the data being representative of email sending features of hosts operating within the botnets, and applying a model (e.g., Gaussian model, Cauchy model, etc.) to the elements within the data. Each element within the model may be scored. A number of outliers in the model may be detected by fitting the elements using the model, and the hosts may be grouped into a cluster by comparing the number of outliers to a predetermined threshold.

In some implementations, a system for detecting spam from botnets may include an email server that receives emails from incoming hosts and that logs simple mail transfer protocol (SMTP) related data, and a modeling engine that analyzes the data to determine a similarity of email contents, a similarity of sending time of the emails, or a similarity of email sending behavior to create a model. This model for example can be a Gaussian model. The modeling engine may determine clusters based on the model.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific processes and instrumentalities disclosed. In the drawings.

DETAILED DESCRIPTION

Figure 1:
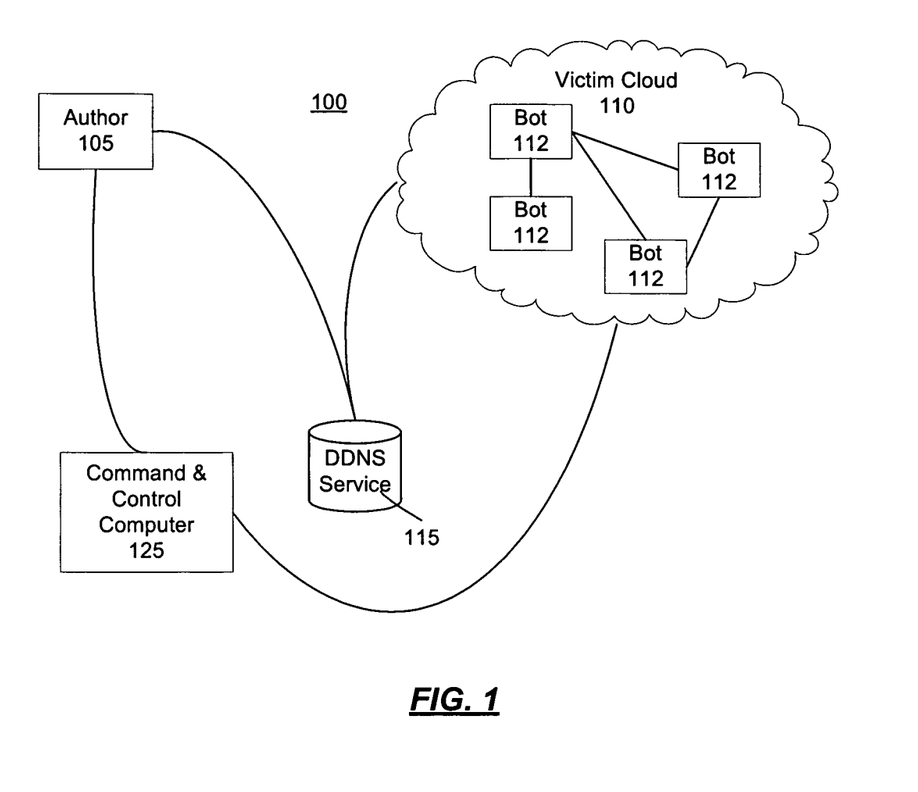
FIG. 1 illustrates an exemplary botnet environment.

FIG. 1 illustrates an exemplary botnet environment 100 including botnets that may be utilized in an attack on an email server. FIG. 1 illustrates a malware author 105, a victim cloud 110 of bot computers 112, a Dynamic Domain Name System (DDNS) service 115, and a Command and Control (C&C) computer 125. Upon infection, each bot computer 112 contacts the C&C computer 125. The malware author 105 may use the C&C computer 125 to observe the connections and communicate back to the victim bot computers 112. More than one C&C computer 125 may be used, as a single abuse report can cause the C&C computer 125 to be quarantined or the account suspended. Thus, malware authors typically may use networks of computers to control their victim bot computers 112. Internet Relay Chat (IRC) networks are often utilized to control the victim bot computers 112, as they are very resilient. However, botnets have been migrating to private, non-IRC compliant services in an effort to avoid detection. In addition, malware authors 105 often try to keep their botnets mobile by using the DDNS service 115, which is a resolution service that facilitates frequent updates and changes in computer locations. Each time the botnet C&C computer 125 is shut down, the botnet author may create a new C&C computer 125 and update a DDNS entry. The bot computers 112 perform periodic DNS queries and migrate to the new C&C location. This practice is known as bot herding.

When botnets are utilized for an attack, the malware author 105 may obtain one or more domain names (e.g., example.com). The newly purchased domain names may be initially parked at 0.0.0.0 (reserved for unknown addresses). The malware author 105 may create a malicious program designed or modified to install a worm and/or virus onto a victim bot computer 112.

The C&C computer 125 may be, for example, a high-bandwidth compromised computer. The C&C computer 125 may be set up to run an IRC service to provide a medium for which the bots to communicate. Other services may be used, such as, but not limited to web services, on-line news group services, or VPNs. DNS resolution of the registered domain name may be done with the DDNS service 115. For example, the IP address provided for in the registration is for the C&C computer 125. As DNS propagates, more victim bot computers 112 join the network. The victim bot computer 112 contacts the C&C computer 125 and may be compelled to perform a variety of tasks, such as, for example, but not limited to updating their Trojans, attacking other computers, sending spam emails, or participating in a denial of service attack.

In some implementations, analysis of spamming botnet characteristics and identification of trends may be performed that may aid botnet detection and defense mechanisms. The analysis may include tracking the associated email content patterns and sending behavior that are directly observable from a single vantage point. A signature may be used to determine botnet spam and membership. Information pertaining to botnet membership may be used to prevent future nefarious attacks such as phishing and DDoS attacks.

The characteristics of the botnets may be determined by analyzing their distribution over the Internet and their overall sending patterns. Each botnet may be studied for its individual behavior. The similarity and overlap across different botnets may then be assessed. Because botnet hosts are often used to actively scan and infect other hosts, the botnet spamming activities may be correlated with the network scanning activities using the distributed telescope data.

In some implementations, to detect botnet hosts using content independent features, it may be determined if botnet hosts exhibit distinct email sending patterns when analyzed without regard for botnet membership. From the viewpoint of a server receiving incoming emails from other servers, the following features, collected at the SMTP protocol level, may be used:

(1) Data command per recipient, which measures the ratio of SMTP data commands to the number of recipients initiated by this host. A ratio of one indicates one data command (email) is sent to only one recipient. A ratio close to zero means that an email has a large number of recipients;

(2) Connections per second, which records the frequency of incoming connections received from the host; and (3) Invalid recipient frequency, which tracks the rate of observing an invalid recipient normalized by the number of valid emails received from the host.

Figure 2A:
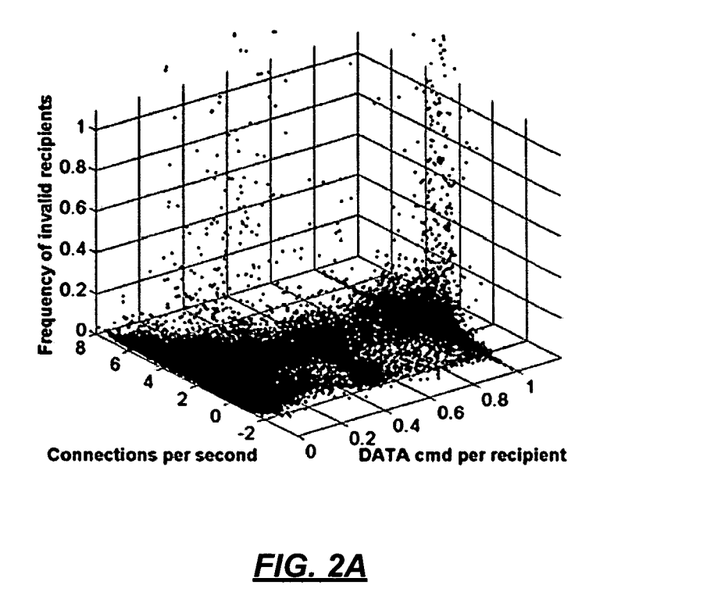
FIGS. 2A and 2B illustrate sending patterns corresponding to botnet hosts and all incoming hosts.
Figure 2B:
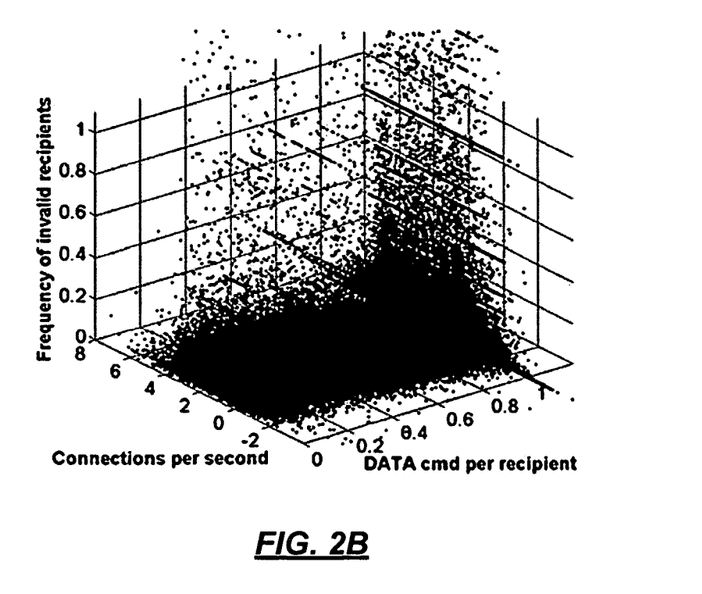

The data command per recipient and connections per second features may reflect the aggressiveness of a spammer. The invalid recipient frequency feature provides a measure on the amount of traffic destined to invalid email addresses, indicating whether spammers are scanning the email address space trying to obtain valid email addresses. As shown in FIGS. 2A and 2B, each may be mapped to a coordinate and each botnet IP sending pattern plotted as a point in the three-dimensional space (e.g., measured during the day of receiving the identified botnet spam email).

FIG. 2A illustrates sending patterns corresponding to (randomly sampled) botnet hosts. FIG. 2B illustrates sending patterns corresponding to (randomly sampled) all incoming hosts. For both cases, the data are well spread out in the space, suggesting botnet hosts have quite different sending patterns when viewed as a whole. Their patterns are not very different from other hosts.

In view of the above, in some implementations, each individual botnet may be examined to determine whether hosts within a botnet exhibit varied behavior. For example, the content similarity of botnet emails may be examined. For each email that was sent by this botnet, its contents may be shingled. For a majority of botnets, most of their emails share at least one shingle. However, the likelihood of these emails sharing all shingles is very low as because spammers can add some random text to the emails to make them dissimilar. Therefore, the email contents could be quite different even though their ultimate destination Web pages are similar.

In some implementations, the synchronous degree of spam sending time for each botnet is examined. For each botnet, a standard deviation (std) of spam email sending time is determined. Empirical analysis suggests that a majority of botnets have std less than 1.81 hours, i.e., they send emails almost simultaneously and are likely triggered by a single command. The rest of the botnets have a larger variation, suggesting those bots might start sending whenever they become online. Overall, 90% of botnets have std less than 24 hours and were likely due to different time zones. In general, for a spamming botnet, spam emails are likely to be send in a relative short period (e.g., within a day or several) because botnets are typically rented for a fixed duration. The rent duration can be directly associated with the cost.

In some implementations, the analysis may continue to examine the set of email sending features (1)-(3) described above. It may be determined if hosts in a botnet can be grouped into a well-formed cluster in a high-dimensional (e.g., three-dimensional) space. For each botnet, a model may be used to represent the data. For example, a Gaussian model may be used with full covariance matrix to represent the data and learn the Gaussian parameters. In an implementation, a Cauchy model or other models may be used.

Figure 3:
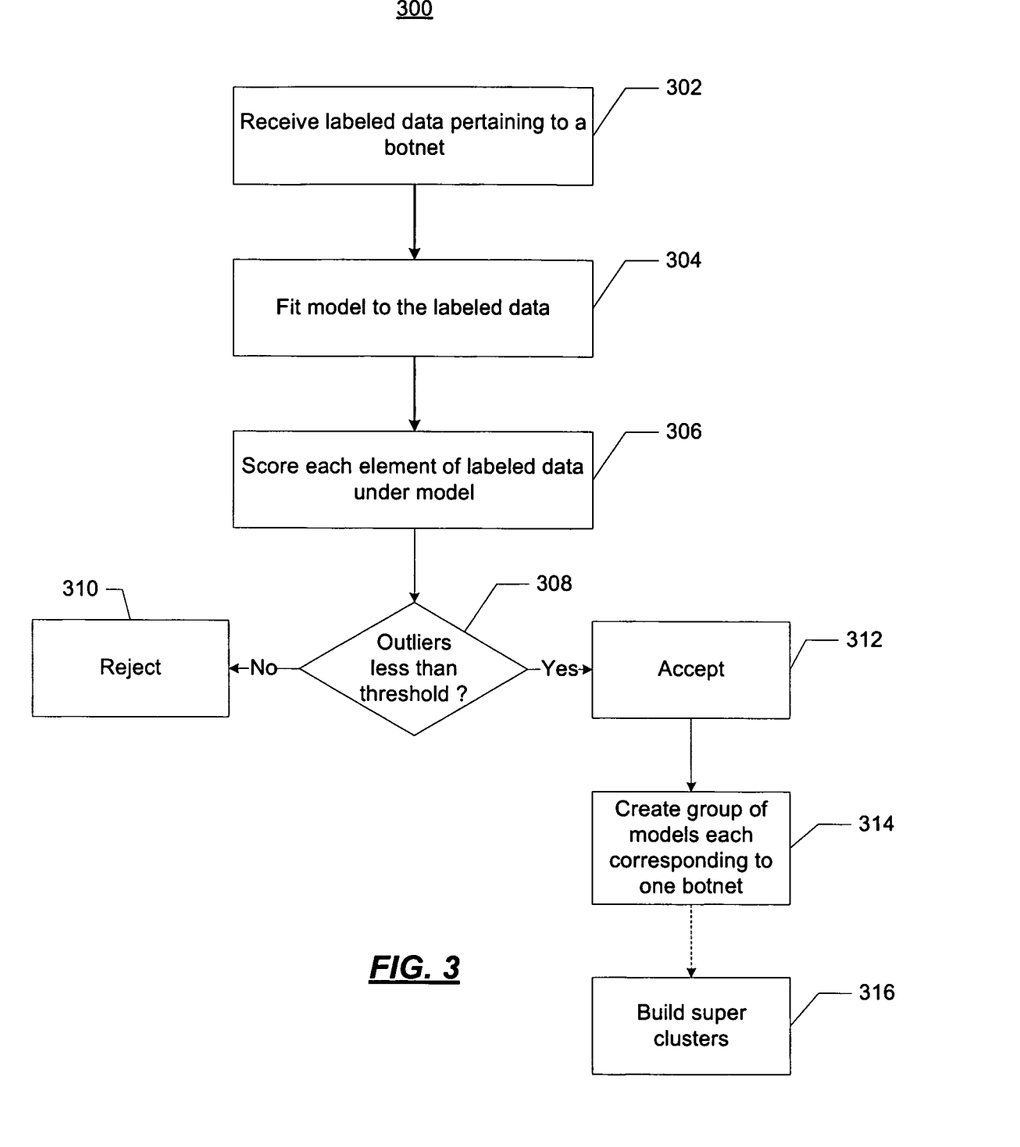
FIG. 3 illustrates an exemplary process for determining the aggregated behavior of botnets using labeled data from the perspective of email servers.

FIG. 3 illustrates an exemplary process 300 for determining the aggregated behavior of botnets from the perspective of an email server using labeled (training) data. At 302, labeled data is received pertaining to a botnet. This data may be activities of the botnet derived at the SMTP protocol level, SMTP logs, or analysis of URL signatures.

At 304 a model is fit to the labeled data. At a modeling engine within, e.g., a mail server infrastructure, and given N sets $B_n$, $n=\{1, 2, \ldots, N\}$, where each set is associated to activities pertaining to a unique botnet, a clustering of the underlying host properties may be determined. The following may be written $B_i = \{x_1^t, x_2^t, x_3^t,\}$, $t=1, \ldots |B_i|$ where the three coordinates correspond to the three features described, and t indexes the data with $|B_i|$ denoting the cardinality of set $B_i$. The above is used to determine a parameterized (clustering) model using unlabeled and labeled data and study the possibility of associating using the learned clusters to characterize botnet activities.

Clustering host properties of botnets may be performed by ignoring the botnet class label assigned by a signature generation algorithm and focusing on the underlying host properties, i.e., the data is the set $B = \cup_i^N B^i$, which is unlabeled; $B^t$ denotes the $t^{th}$ training point.

A mixture of Gaussians model may be used to determine clustering. In order to fit a mixture of K Gaussians B, a maximum likelihood estimation may be used, which maximizes log P(B), the log probability of data. Let $B_i$ be the set of (labeled) data pertaining to the ith botnet. Then the model characterizing the ith botnet may be determined as follows for labeled data:

$$M_i = \underset{\Theta}{\mathrm{argmax}} \log P(B_i \mid \Theta)$$

$$= \underset{\Theta}{\mathrm{argmax}} \log \prod_{t=1}^{|B_i|} P(B_i^t \mid \Theta)$$

$$= \underset{\Theta}{\mathrm{argmax}} \log \sum_{t=1}^{|B_i|} P(B_i^t \mid \Theta)$$

where $\Theta$ denotes the parameters for distribution. For example, if P is assumed to be Gaussian, $\Theta$ would correspond to the mean and covariance of the distribution.

At 306, each element in the data under the model is scored. In some implementations, the labeled data may be used to obtain a good clustering. The host properties of each botnet may be considered separately and used to learn the parameters of model. For example, they may be used to learn the parameters of a Gaussian distribution with full covariance matrix (in three dimensions) using maximum likelihood estimation.

At 308, it is determined if the number of outliers in the model are less than a threshold. The threshold may be set at, e.g. 10%, as host sending patterns are generally well clustered with less than 10% outliers. At 310, if the percentage of outliers is greater than the threshold, then the botnet host sending patterns do not fit into a cluster and the botnet is rejected. At 312, if the percentage of outliers is less than the threshold, then at 314 a group is created corresponding to a botnet.

Overlaps among different botnets may be encountered. Emails from a large number of botnets may share common or similar URL patterns. Accordingly, it may be determined whether these botnets essentially correspond to the same set of hosts. For each common URL pattern, the set of botnets (say a total of k botnets) may be identified that share this pattern. Next the ratio of the number of unique IPs across the k botnets may be plotted to the sum of their IPs as a function of k. If the ratio is close to 1 when k is small, the botnets sharing a common URL pattern barely overlap with each other in most of the cases. With k increasing, the degree of overlap gradually decreases.

At 316 superclusters may be created. The superclusters account for the sending patterns across botnets and may be determined based on the similarity of the estimated mean. Clusters having covariance matrices that are not compact may be discarded, whereas those with a compact covariance may be grouped together into a supercluster.

Figure 4:
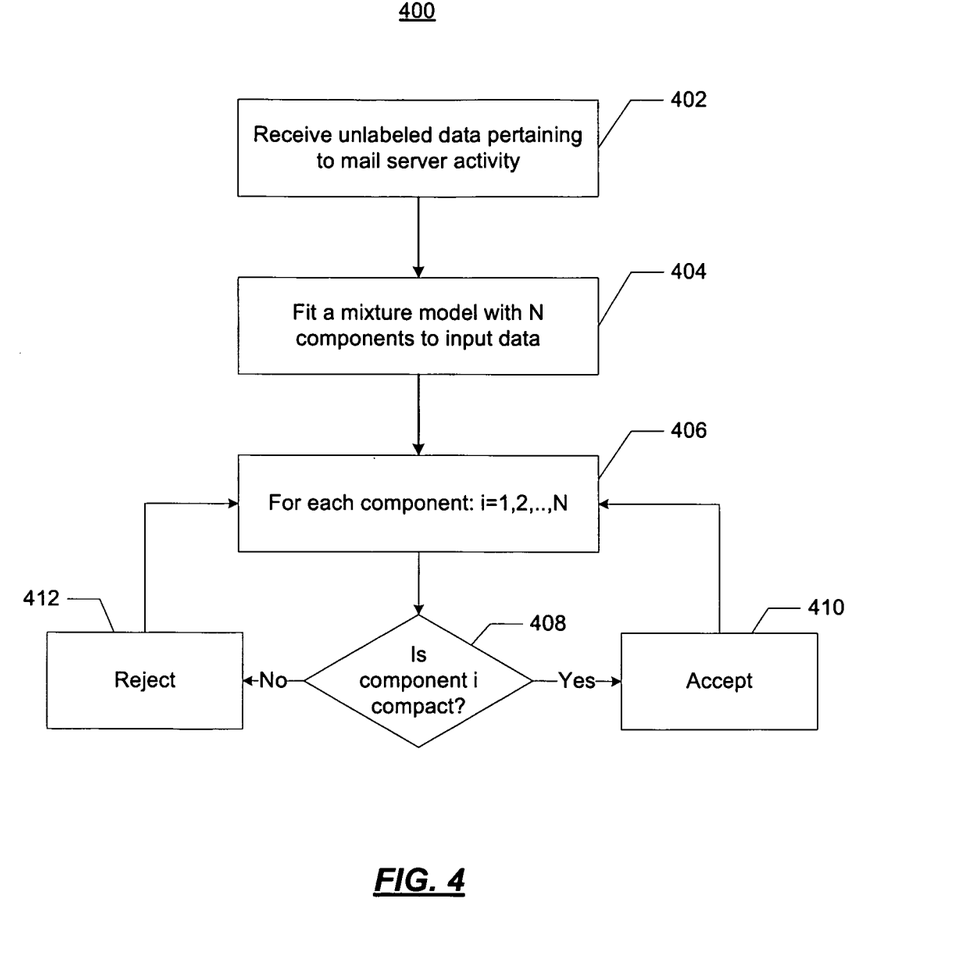
FIG. 4 illustrates an exemplary process for determining the aggregated behavior of botnets using unlabeled data from the perspective of email servers.

FIG. 4 is an exemplary process 400 for determining the aggregated behavior of botnets using unlabeled data from the perspective of an email server. In some implementations, at 402, it may be determined how many botnets each bot host participates from the received data. Generally, a bot host participates in one botnet (whether a host was set up using a dynamic or static IP address). This data may be ascertained from the mail server logs.

At 404, a mixture model is fit to components of the input data. This may determine the similarity of sending patterns across botnets and may be examined using the learned Gaussian models. If B is the set of all unlabeled data pertaining to mail server logs. In some implementations, a mixture model may be fixed to this dataset in an unsupervised fashion. The log probability of observing B under a mixture of Gaussians model may be determined as follows for unlabeled data:

$$\log P(B \mid \Theta) = \log \prod_{t=1}^{|B|} \left( \sum_{k=1}^{K} P(c=k) P(B^t \mid C=k) \right)$$
$$= \sum_{t=1}^{|B|} \log \sum_{k=1}^{K} \pi_k N(B^t; \mu_k, \Psi_k)$$

Learning the mixture model amounts to estimating the optimal parameters $\Theta = \{(\pi_k, \mu_k, \Psi_k), \forall k\}$ that best explain the input data B, which may be achieved using an EM algorithm or gradient descent techniques.

At 406, for each component, the similarity of the estimated mean is examined. If, at 408, the covariance matrix of component i is compact (i.e., the data is tightly grouped), then the individual botnet clusters may be accepted at 410 and grouped into superclusters based on the similarity of the estimated mean. Clusters whose covariance matrices are not compact at 408, and hence the data are too well spread out, are discarded at 412.

For botnets that send common URL links or URL patterns in their emails, the botnets map to a model that may suggest spammers may all use one of a few malicious software programs to launch botnet spamming attacks.

In some implementations, the network scanning behavior of the identified botnet hosts may be analyzed using distributed telescope data. A set of botnet IPs may be examined by focusing on the source IP address and the port number fields. For dynamic botnet IP addresses, the scanning activities from the corresponding dynamic IP ranges may be used. Using the dynamic IP ranges, together with the remaining "likely static" IPs, the number of scans originating from these IP addresses may be plotted into a set of popular scanning destination ports to analyze network scanning behavior.

EXEMPLARY COMPUTING ARRANGEMENT

Figure 5:
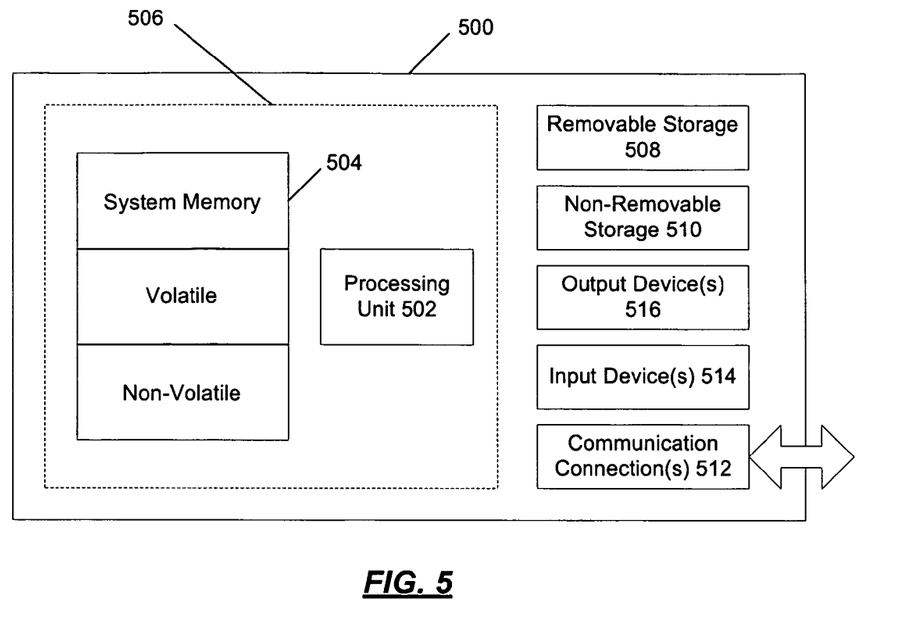
FIG. 5 shows an exemplary computing environment.

FIG. 5 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by device 500 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communications connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method of spammer detection, comprising:
    configuring at least one processor to perform the functions of:
        receiving, at an email server, email data related to a plurality of hosts;
        analyzing a plurality of features within the email data as received at the email server, the features including at least one of email contents, a sending time of the email, or an email sending behavior;
        computing a plurality of distances between a plurality of vectors in a three-dimensional space based on the features;
        determining a plurality of clusters of hosts based on the distances;
        using the plurality of clusters of hosts to characterize botnet activities for spammer detection, the characterizing comprising:
            determining that a set of botnets belongs to a set of hosts in the plurality of clusters of hosts;
            determining a total number of botnets that share a sending pattern; and
            using the sending pattern to determine a similarity of sending patterns across botnets.

2. The computer-implemented method of claim 1, wherein determining the clusters comprises:
    receiving labeled data associated with a botnet;
    fitting a mixture model to a plurality of components of the labeled data; and
    determining if each component is compact.

3. The computer-implemented method of claim 2, further comprising:
    discarding the component if it is not compact.

4. The computer-implemented method of claim 2, further comprising:
    building a group of mixture models that each correspond to the botnet.

5. The computer-implemented method of claim 1, further comprising:
    grouping botnet clusters into superclusters based on an estimated mean of a covariance matrix.

6. The computer-implemented method of claim 1, further comprising:
    determining a standard deviation of the sending time of emails to determine a similarity of sending time.

7. The computer-implemented method of claim 1, further comprising:
    applying a model to determine a similarity of the email sending behavior; and
    determining if host sending patterns are well clustered within a botnet based on the number of outliers.

8. The computer-implemented method of claim 7, further comprising:
    applying a first model to labeled data; and
    applying a second model to unlabeled data.

9. The computer-implemented method of claim 1, wherein the features are represented as the vectors in the three-dimensional space.

10. A computer-implemented method of determining botnets, comprising:
    configuring at least one processor to perform the functions of:
        receiving, at an email server, email data being representative of a plurality of email sending features of a plurality of hosts operating within the botnets;
        applying a model to a plurality of elements within the email data as received at the email server;
        scoring each element within the model;
        comparing a number of outliers in the model to a threshold;
        grouping the hosts into a cluster based on the comparison of the number of outliers to the threshold;

using the cluster to characterize botnet activities, the characterizing comprising:
  determining that a set of botnets belongs to a set of hosts in the cluster;
  determining a total number of botnets that share a sending pattern; and
  using the sending pattern to determine a similarity of sending patterns across botnets.

11. The computer-implemented method of claim 10, further comprising:
  grouping a plurality of botnet clusters into a plurality of superclusters based on an estimated mean of a covariance matrix determined as part of the model.

12. The computer-implemented method of claim 10, further comprising:
  determining a similarity of content in a plurality of emails sent by the hosts; and
  determining a standard deviation of a send time of emails.

13. The computer-implemented method of claim 10, further comprising:
  applying a first model to labeled data as the model; and
  applying a second model to unlabeled data as the model.

14. A system for detecting spam from botnets, comprising:
  at least one computing device;
  an email server that receives a plurality of emails from a plurality of incoming hosts and that logs simple mail transfer protocol related data; and
  a modeling engine that receives labeled data associated with one botnet and fits a model to the received simple mail transfer protocol related data, wherein each element of the labeled data is scored, and further wherein the modeling engine analyzes the received simple mail transfer protocol related data to determine at least one of a similarity of emails, a similarity of sending time of the emails, or a similarity of email sending behavior to create a Gaussian model; and
  using the Gaussian model to identify at least one cluster of hosts corresponding to at least one botnet that is involved in spamming.

15. The system of claim 14, wherein a plurality of mixture models are fit with components of the received simple mail transfer protocol related data, and wherein it is determined if each component is compact.

16. The system of claim 15, wherein a supercluster of botnets is created if when different mixture models have a threshold level of similarity.

17. The system of claim 14, wherein a number of outliers are detected by their scores, and wherein the model is determined to be compact by comparing the number of outliers to a threshold.

* * * * *